United States Patent
Li et al.

(10) Patent No.: US 10,209,782 B2
(45) Date of Patent: Feb. 19, 2019

(54) INPUT-BASED INFORMATION DISPLAY METHOD AND INPUT SYSTEM

(71) Applicant: BEIJING SOGOU TECHNOLOGY DEVELOPMENT CO., LTD., Beijing (CN)

(72) Inventors: Yanmei Li, Beijing (CN); Ping Li, Beijing (CN)

(73) Assignee: Beijing Sogou Technology Development Co., Ltd., Beijing (CN)

(*) Notice: Subject to any disclaimer, the term of this patent is extended or adjusted under 35 U.S.C. 154(b) by 27 days.

(21) Appl. No.: 15/508,721

(22) PCT Filed: Aug. 14, 2015

(86) PCT No.: PCT/CN2015/087058
§ 371 (c)(1),
(2) Date: Mar. 3, 2017

(87) PCT Pub. No.: WO2016/045465
PCT Pub. Date: Mar. 31, 2016

(65) Prior Publication Data
US 2017/0277277 A1  Sep. 28, 2017

(30) Foreign Application Priority Data
Sep. 25, 2014 (CN) .......................... 2014 1 0499401

(51) Int. Cl.
*G06F 3/023* (2006.01)
*G06F 3/0481* (2013.01)
(Continued)

(52) U.S. Cl.
CPC .......... *G06F 3/0237* (2013.01); *G06F 3/0481* (2013.01); *G06F 17/2785* (2013.01); *G06F 17/30528* (2013.01)

(58) Field of Classification Search
CPC ............................. G06F 3/0237; G06F 3/0481
See application file for complete search history.

(56) References Cited

U.S. PATENT DOCUMENTS

| | | | | |
|---|---|---|---|---|
| 2004/0186848 | A1* | 9/2004 | Kobashikawa | G06Q 10/107 |
| 2005/0107127 | A1* | 5/2005 | Moriya | G06F 17/30265 |
| | | | | 455/566 |

(Continued)

FOREIGN PATENT DOCUMENTS

| | | | | |
|---|---|---|---|---|
| CN | 103809766 | * | 5/2014 | .......... G06F 3/0237 |
| CN | 103809766 A | | 5/2014 | |

(Continued)

OTHER PUBLICATIONS

The World Intellectual Property Organization (WIPO) International Search Report for PCT/CN2012/087058 dated Nov. 10, 2015 6 Pages.

*Primary Examiner* — Yi Yang
(74) *Attorney, Agent, or Firm* — Anova Law Group, PLLC (57) ABSTRACT

An input-based information display method and an input system are provided. The method includes: using context information to perform recognition processing on a received input string, and recognizing a current semantic keyword; determining display information that matches the semantic keyword, and displaying the display information in a form of a pop-up bubble, where the display information includes but is not limited to expression images; and performing display processing on the display information according to an user instruction, where the display processing includes but is not limited to performing an enter-on-screen operation of the expression images. The recognized current semantic keyword of the present disclosure is not limited to a candidate item corresponding to the input string, and the semantic (Continued)

recognition based on the context information may better reflect the user input intention.

20 Claims, 5 Drawing Sheets (51) Int. Cl.
 *G06F 17/27* (2006.01)
 *G06F 17/30* (2006.01)

(56) References Cited

U.S. PATENT DOCUMENTS

| | | | |
|---|---|---|---|
| 2008/0129757 A1* | 6/2008 | Tanaka | G06F 3/0482 345/660 |
| 2009/0070375 A1* | 3/2009 | Choi | G06F 17/30787 |
| 2010/0153111 A1* | 6/2010 | Hirai | B60R 16/0373 704/251 |
| 2010/0153339 A1* | 6/2010 | Wang | G06F 17/30174 707/638 |
| 2013/0041911 A1* | 2/2013 | Kim | G06F 17/30023 707/766 |

FOREIGN PATENT DOCUMENTS

| | | |
|---|---|---|
| CN | 103853446 A | 6/2014 |
| CN | 104298429 A | 1/2015 |

\* cited by examiner

FIG. 6

INPUT-BASED INFORMATION DISPLAY METHOD AND INPUT SYSTEM

CROSS-REFERENCES TO RELATED APPLICATIONS

This application is a national phase entry under 35 U.S.C § 371 of International Application No. PCT/CN2015/087058, filed on Aug. 14, 2015, which claims priority of Chinese Patent Application No. 201410499401.6, entitled "INPUT-BASED INFORMATION DISPLAY METHOD AND INPUT SYSTEM", filed with the State Intellectual Property Office of P.R. China on Sep. 25, 2014, the entire contents of all of which are incorporated herein by reference.

FIELD OF THE DISCLOSURE

The present disclosure generally relates to the field of input method and, more particularly, relates to an input-based information display method, and an input system.

BACKGROUND

An input method is a coding method applied to input various symbols into a computer or other devices (e.g., a cell phone). For example, when a user performs input using an input method, the input method may convert the user input content to corresponding word content, and enter the word content on screen based on the user feedback.

However, when inputting word content or texts, sometimes the user may also want to insert animation content, such as corresponding expressions and images, etc. By then, the word content to be entered on screen needs to be fed back and, after the word content is entered on screen, the user may select and enter the to-be-input animation content on screen by opening animation-related plug-ins. Thus, the input process is relatively complicated, seriously impacting the input efficiency.

BRIEF SUMMARY OF THE DISCLOSURE

The technical issue to be solved by embodiments of the present disclosure is to provide an input-based information display method, thereby solving the issue of a relatively low efficiency caused by separate input of words and expressions in an input method.

Correspondingly, embodiments of the present disclosure also provide an input system configured to ensure the implementation and application of the aforementioned method.

Directed to solving the aforementioned issue, the present disclosure provides an input-based information display method, including: using context information to perform recognition processing on a received input string, and recognizing a current semantic keyword; determining display information that matches the semantic keyword, and displaying the display information in a form of a pop-up bubble, where the display information includes but is not limited to expression images; performing display processing on the display information according to a user instruction, where the display processing includes but is not limited to performing an enter-on-screen operation of the expression images.

Optionally, using the context information to perform recognition processing on the received input string, and recognizing the current semantic keyword includes: converting the input string, and recognizing each candidate item corresponding to the input string; combining the context information and each candidate item into a candidate sentence, respectively; performing semantic analysis of each candidate sentence, respectively, and recognizing the current semantic keyword.

Optionally, determining the display information that matches the semantic keyword includes: matching locally stored display information with the semantic keyword, and determining the display information that matches the semantic keyword; and/or, uploading the semantic keyword, and receiving the display information fed back by a server and determined via matching that matches the semantic keyword.

Optionally, before a step of determining the display information that matches the semantic keyword, the information display method further includes: detecting whether an update packet of the display information exists on a server side; and when the update packet of the display information exists, downloading and storing the update packet locally.

Optionally, after a step of determining the display information that matches the semantic keyword, the information display method further includes: recognizing current environment information, and screening the display information that matches the semantic keyword according to recognized environment information.

Optionally, the information display method further includes: sorting the display information according to a pre-configured rule, and determining a sort order of the display information, where sorting factors in the pre-configured rule include but are not limited to a usage count of the display information, time when the display information is lastly used, a recommendation index of the display information, and a user's interest degree, etc.

Optionally, a step of displaying the display information in the form of a pop-up bubble includes: acquiring first N display information according to the sort order, and displaying the first N display information in the form of a pop-up bubble at a cloud recommendation position of the current input method.

Optionally, the display information further includes multimedia information and webpage link information.

Optionally, a step of performing display processing on the display information according to the user instruction includes: when the display information is expression images, performing selection of the expression images according to the user instruction, and entering a selected expression image on screen; when the display information is multimedia information, performing selection of the multimedia information according to the user instruction, and broadcasting the selected multimedia information; and when the display information is webpage link information, performing selection of the webpage link information according to the user instruction, and launching a webpage corresponding to the webpage link information.

Correspondingly, the present disclosure also provides an input system, including: a keyword recognition module, configured to perform recognition processing on a received input string using context information, and recognize a current semantic keyword; a display information matching module, configured to determine display information that matches the semantic keyword, where the display information includes but is not limited to expression images; a pop-up bubble displaying module, configured to display the display information in a form of a pop-up bubble; a display processing module, configured to perform display processing on the display information according to a user instruction, where the display processing includes but is not limited to performing an enter-on-screen operation of the expression images.

Optionally, the keyword recognition module is configured to convert the input string, and recognize each candidate item corresponding to the input string; combine the context information and each candidate item into a candidate sentence, respectively; perform semantic analysis of each candidate sentence, respectively, and recognize the current semantic keyword.

Optionally, the display information matching module is configured to match locally stored display information with the semantic keyword, and determine the display information that matches the semantic keyword; and/or uploading the semantic keyword, and receive the display information fed back by a server and determined via matching that matches the semantic keyword.

Optionally, the input system further includes: an update module, configured to detect whether an update packet of the display information exists on a server side; and when the update packet of the display information exists, download and store the update packet locally.

Optionally, the input system further includes: an environment recognition module, configured to recognize current environment information, and screen the display information that matches the semantic keyword according to recognized environment information.

Optionally, the input system further includes: a sorting module, configured to sort the display information according to a pre-configured rule, and determine a sort order of the display information, where sorting factors in the pre-configured rule include but are not limited to a usage count of the display information, time when the display information is lastly used, a recommendation index of the display information, and a user's interest degree.

Optionally, the pop-up bubble displaying module is configured to acquire first N display information according to the sort order, and display the first N display information in the form of a pop-up bubble at a cloud recommendation position of the current input method.

Optionally, the display information further includes multimedia information and webpage link information.

Optionally, the display processing module is configured to when the display information is expression images, perform selection of the expression images according to the user instruction, and enter a selected expression image on screen; when the display information is multimedia information, perform selection of the multimedia information according to the user instruction, and broadcast the selected multimedia information; and when the display information is webpage link information, perform selection of the webpage link information according to the user instruction, and launch a webpage corresponding to the webpage link information.

Embodiments of the present disclosure also provide a program, including readable codes. When the readable codes are run on a computational device, the computational device may execute the input-based information display method according to any one of the embodiments of the present disclosure.

Embodiments of the present disclosure also provide a readable medium, where the program illustrated in embodiments of the present disclosure is stored.

Compared to existing technologies, embodiments of the present disclosure includes the following advantages:

Because the context information is used to perform recognition processing on the received input string, the recognized current semantic keyword is not limited to the candidate item corresponding to the input string, and the semantic recognition based on the context information may better reflect the user input intention. Then, the display information that matches the semantic keyword is determined and, thus, the display information may better reflect the user input intention. The display information is displayed in the form of a pop-up bubble, and then display processing on the display information is performed according to the user instruction. For example, if the display information includes an expression image, the expression image may be entered on screen according to the instruction information. Thus, the display information may be acquired and displayed before a word is entered on screen, thereby improving the input efficiency of the display information, such as words and expressions, etc.

DETAILED DESCRIPTION

To make the above-mentioned object, features and advantages more apparent and easier to understand, hereinafter, the present disclosure will be made in detail with reference to the accompanying drawings and specific embodiments.

One of the aspects of the embodiments of the present disclosure is to provide an input-based information display method, thereby solving the issue of a relatively low efficiency caused by separate input of the words and expressions in an input method. Because the context information is used to perform recognition processing on the received input string, the recognized current semantic keyword is not limited to the candidate item corresponding to the input string, and the semantic recognition based on the context information may better reflect the user input intention. Then, the display information that matches the semantic keyword is determined and, thus, the display information may better satisfy the user input intention. The display information is displayed in the form of a pop-up bubble, and then display processing on the display information is performed according to the user instruction. For example, if the display information includes an expression image, the expression image may be entered on screen according to the instruction information. Thus, the display information may be acquired and displayed before a word is entered on screen, thereby improving the input efficiency of the display information, such as words and expressions, etc.

Embodiment 1

Figure 1:
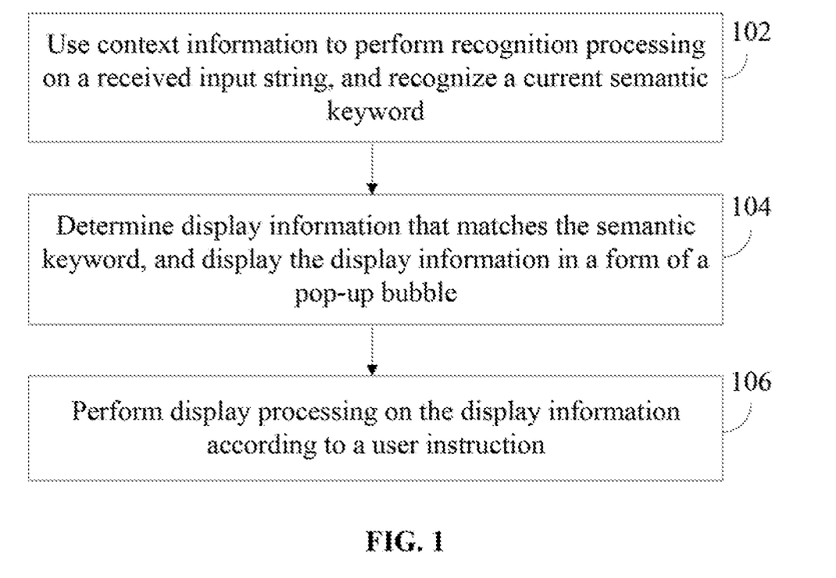
FIG. 1 illustrates a flow diagram of an input-based information display method consistent with embodiments of the present disclosure.

Referring to FIG. 1, a flow diagram of an input-based information display method consistent with embodiments of the present disclosure is illustrated, which specifically includes the following steps:

Step 102, using context information to perform recognition processing on a received input string, and recognizing a current semantic keyword.

During a process where a user performs input using an input method, a client terminal of the input method may acquire a current input string, and transmit the input string to a kernel of an input system. The kernel executes a series of kernel functions such as analysis and recognition, etc. on the received input string. For example, when English is inputted, the input string is recognized to acquire a corresponding English word candidate item. Or, for example, when Chinese is inputted, the input string undergoes operations such as segmentation and conversion to acquire a corresponding Chinese candidate item. Further, the context information is used to further recognize each candidate item, thereby recognizing the current semantic keyword.

For example, when a current input string "gaoxing (e.g., meaning 'happy' in Chinese pinyin)" is acquired, the candidate item is recognized to be "高兴 (happy)", and because the recorded context information is "'我今天很不 (today I am extremely not)", the current semantic keyword may be recognized as "不高兴 (not happy)" according to the context information.

In another example, when a current input string "bunanguode (e.g., meaning 'not sad' in Chinese pinyin)" is acquired, the candidate item is recognized to be " 不难过的 (not sad)", and because the recorded context information is "看到今天 的情况没有 (seeing today's situation, no one)", what the user wants to input is determined to be " 看到今天的情 况没有不难过的 (seeing today's situation, no one is not sad)" according to the context information. Based on the Chinese semantic analysis where double negative means positive, the semantic keyword is recognized to be " 难过 (sad)".

Or, for example, when a string "easy" is acquired, the semantic meaning is directly recognized to be "容易 (easy)". But because the context information is "take it", what the user wants to input is determined to be "take it easy" according to the context information, and the actual semantic keyword is recognized to be " 放轻松 (take it easy)".

In particular, the input string is the user input content directly received by the input system, and the user may input characters by applying any input manners. For example, the input may be implemented via a keyboard, a touch screen, and voice, etc., or the input may be implemented via a handwriting pad, a touch screen, a microphone, etc. The kernel refers to a mechanism where a core algorithm of the input system reasonably displays an output term according to the input content.

In Step 104, display information that matches the semantic keyword is determined, and the display information is displayed in a form of a pop-up bubble.

The display information is matched locally or on a network side according to the recognized semantic keyword, and the display information corresponding to the semantic keyword is determined. In one embodiment, the display information includes but is not limited to expression images. That is, the expression images may be matched according to the semantic keyword. In particular, the expression image may be a static image or a dynamic image.

The input method may display the candidate item corresponding to the aforementioned input string, and display the display information corresponding to the semantic keyword in the form of a pop-up bubble. That is, the input method may, for example, preview and recommend the display information. Accordingly, the display information is matched during a word input process before being entered on screen. In particular, the form of a pop-up bubble refers to a form that a display box is popped up to display information. For example, in the input method, a key-press may be displayed in a display box in the key-press displaying region, or a candidate item may be displayed in a display box in the candidate displaying region, etc. Further, a display box may be popped up to display other information based on input matching, such as the display information that matches the semantic keyword. That is, the display information is displayed in the form of a pop-up bubble.

In Step 106, display processing is performed on the display information according to a user instruction.

When the display information is displayed in the aforementioned form of a pop-up bubble, the process may be considered as preview and recommendation, etc. of the display information. Later, the user may perform processing such as selection of the information displayed in a pop-up bubble, such that after receiving the user instruction, the information display method may perform selection of and execute display processing on the display information according to the user instruction.

For example, when the display information is expression images, the display processing on the selected expression image may include but is not limited to: entering the expression image on screen, such that during the string input process, the corresponding display information is determined and displayed before an item to be entered on screen is selected.

Further, during display processing, the candidate item corresponding to the display information may be entered on screen. In an aforementioned example, the semantic keyword corresponding to the display information is " 不高兴 (not happy)", and the corresponding candidate item is "高兴 (happy)". Thus, when the expression image corresponding to "不高兴 (not happy)" is entered on screen, the candidate item "高兴 (happy)" may also be entered on screen. Optionally, only the display information is displayed, and subsequently, the candidate item may be selected to be entered on screen according to the user instruction.

The aforementioned "entered on screen" refers to a process that the input method outputs a selected candidate item. In particular, the candidate item may be entered on different locations based on different current application environments. For example, in a chat environment of an instant messaging application, the candidate item entered on screen may be displayed in the information input box of a chat local end, and further may be displayed in a chat window only after confirmation of delivery. In a chat environment of an input method, when entering the display information on screen, the display information may be entered in the information input box, or entered in the chat window.

Further, because the display information determined according to the semantic keyword may be different from a semantic meaning of a current input candidate item, after the display information is selected and entered on screen, content such as a negative word that affects the semantic meaning of the current display information may be deleted from the context information that is already entered on screen. For example, for the display information determined by recognizing the semantic keyword of the aforementioned input "gaoxing (e.g., meaning 'happy' in Chinese pinyin)" to be "不高兴 (not happy)", the negative word "不 (not)" in the context information "我今天很不 (today I am extremely not)" that is already entered on screen may be deleted. That is, the information entered on screen may be changed to "我今天很 (today I am extremely)", and an expression image corresponding to "不高兴 (not happy)" is displayed.

As such, because the context information is used to perform recognition processing on the received input string, the recognized current semantic keyword is not limited to the candidate item corresponding to the input string, and the semantic recognition based on the context information may better reflect the user input intention. Then, the display information that matches the semantic keyword is determined and, thus, the display information may better reflect the user input intention. The display information is displayed in the form of a pop-up bubble, and then display processing on the display information is performed according to the user instruction. For example, if the display information includes an expression image, the expression image may be entered on screen according to the instruction information. Thus, the display information may be acquired and displayed before a word is entered on screen, thereby improving the input efficiency of the display information such as words and expressions, etc.

Embodiment 2

Based on the aforementioned embodiment, a method for displaying display information that matches an input during an input process of the input method is further described hereinafter.

Figure 2:
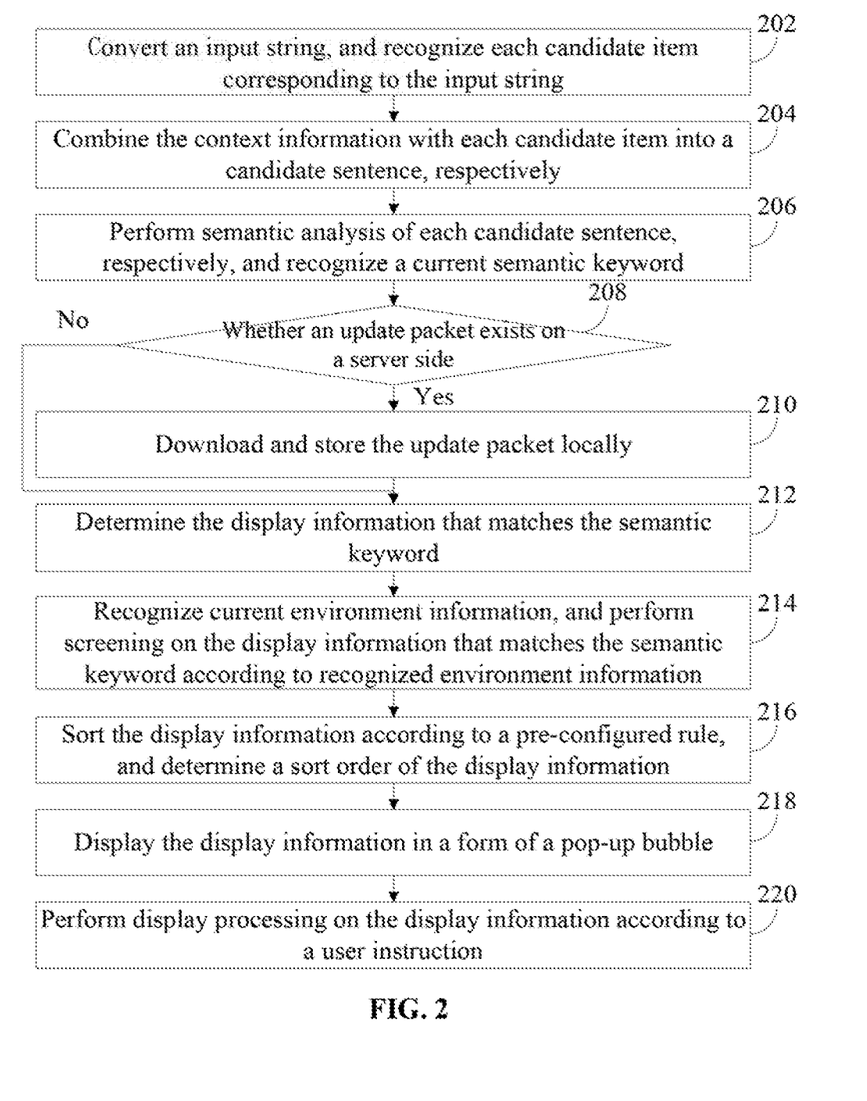
FIG. 2 illustrates a flow diagram of an input-based information display method consistent with optional embodiments of the present disclosure.

Referring to FIG. 2, a flow diagram of an input-based information display method consistent with optional embodiments of the present disclosure is illustrated, which specifically includes the following steps:

Step 202, converting the input string, and recognizing each candidate item corresponding to the input string;

Step 204, combining the context information and each candidate item into a candidate sentence, respectively; and Step 206, performing semantic analysis of each candidate sentence, respectively, and recognizing a current semantic keyword.

During a process where a user performs input using an input method, a current input string may be acquired, the current input string may later be transmitted to the kernel of the input system, and the kernel may perform processing such as analysis, segmentation, conversion, and recognition, etc. on the received input string to acquire the candidate item corresponding to the input string. In particular, the kernel may record the option that is just entered on screen by the user. That is, the kernel may record the context information in advance. Accordingly, when processing the input string, the kernel may perform processing such as conversion and recognition, etc. according to the recorded context information, thereby obtaining more accurate processing results. Further, according to information such as word frequency, user habit, etc, the candidate items may be sorted. For example, when inputting English, the input string may be recognized to acquire a corresponding English word candidate item. Or, for example, when inputting Chinese, processing such as segmentation and conversion, etc. may be performed on the input string to acquire a corresponding Chinese candidate item.

After acquiring each candidate item, the context information may be applied to perform semantic analysis of each candidate item. Because the input string may match a plurality of candidate items, candidate items need to undergo semantic analysis may be determined according to requirements. In particular, a first-screen candidate item refers to a candidate item displayed on screen without a page-turning or sliding operation in the input method interface.

For example, the kernel of the input method may convert the input string and recognize M candidate items, and when applying the context information to conduct analysis, the context information may be combined with each candidate item corresponding to the input string, respectively, to acquire M corresponding candidate sentences. Accordingly, semantic analysis may be performed on each candidate sentence, respectively, to determine the actual meaning of the candidate item expressed in the sentence, such that the current semantic keyword may be determined and recognized. Thus, the semantic keyword may be the candidate item, or may be information such as an entry recognized in the sentence, etc.

For example, when segmenting the candidate sentence, keywords such as nouns, verbs, adjectives, adverbs, prepositions, and auxiliary words, etc. in the candidate sentence may be obtained via segmentation. Further, de-noise processing may be performed on the candidate sentence, for example, useless words such as auxiliary words and prepositions may be deleted. Accordingly, the specific semantic meaning of each keyword associated with the candidate item may be determined according to the segmentation order, thereby obtaining the semantic keyword.

In the aforementioned example, the context information is "看到今天的 情况没有 (seeing today's situation, no one)", and the input string may recognize the candidate items to be "不难过的 (is not sad)" and "不难过地 (does not sadly)", thus forming a candidate sentence A "看到今天的情况没有不难过的 (seeing today's situation, no one is not sad)" and a candidate sentence B "看到今天的情况没有不难过地 (seeing today's situation, no one does not sadly)". Using the candidate sentence A as an example, "看到 (seeing)", "今天 (today)", "的 ('s)", "情况 (situation)", "没有 (no one)", "不 (not)", "难过 (sad)" and "的 (a meaningless preposition)" are obtained after segmentation. After deleting the preposition "的 (the meaningless preposition)", the keywords related to the candidate item "不难过的 (not sad)" are "没有 (no one)", "不 (not)", and "难过 (sad)", which forms "没有不难过 (no one is not sad)" according to the segmentation order. Based on the Chinese semantic analysis where double negative means positive, the semantic keyword is recognized to be "难过 (sad)".

In one embodiment, the context information includes above text information and below text information. If the current input string is located at the end of a document, namely, no subsequent document content exists, and pure words are inputted, the above text information of the current input string is acquired. Correspondingly, if the current input string is located at the forefront of the document, namely, no foregoing document content exists, the below text information of the current input string is acquired. If the current input string is located in the middle of the document, when the document is, for example, edited and modified, because both foregoing and subsequent document contents exist, above text information and below text information of the current input string may be acquired simultaneously.

For example, the top two ranked candidate items may be combined with the context information. In one example, the input string may be "kaixin (e.g., meaning 'happy' in Chinese pinyin)", and the top two ranked candidate items are "开心 (happy)" and "开新 (open new)", respectively. When the above text information is "我现在非常不 (now I am extremely not)", then the candidate sentences obtained after combination are "我现在非常不开心 (now I am extremely not happy)" and "我现在非常不开新 (now I am extremely not open new)". Semantic analysis is performed on each candidate sentence, respectively. For example, semantic analysis such as segmentation, screening, and de-noising, etc. may be performed on the candidate sentence "我现在非常不开心 (now I am extremely not happy)", thereby determining the semantic keyword to be "不开心 (not happy)". That is, based on the context information, the keyword "不开心 (not happy)" that better reflects the user input intent may be matched. If only based on the input string, the candidate item may be determined to be "开心 (happy)", which may highly likely deviate the user input intention, thereby obtaining a wrong recognition result. For example, if an expression representing happy is recommended when the user is not happy, the user experience may be affected.

In Step 208, whether an update packet of the display information exists on a server side is detected.

Whether the terminal end accesses an internet may be detected, and if the terminal end accesses the internet, whether an update packet of the display information exists on the server side maybe detected. The update packet refers to a packet of display information generated during a certain period of time, such as a packet generated after the input method displays information synchronously last time. That is, whether the packet of the display information not stored locally exists or not may be detected on the server side.

In particular, because many recommended update packets may exist on the server side, the packets need to be downloaded may be determined according a recommendation index. In particular, the recommendation index may be configured according to actual demands. For example, the recommendation index may be calculated based on the overall user usage popularity of new expression, or information such as the time that the expression is generated.

If so, namely, an update packet of the display information exists on the server side, Step 210 is executed; if not, namely, no update packet of the display information exists on the server side, Step 212 is executed.

In Step 210, the update packet is downloaded and stored locally.

When the update packet of the display information exists, the update packet is downloaded and stored locally. That is, the packet of display information stored locally is synchronized, such that the display information may be directly matched locally. Accordingly, the matching efficiency is improved, and acquisition of relatively new display information may also be ensured even if the client terminal of the input method does not access the internet, thereby providing recommendation information that reflects the user intention.

In Step 212, the display information that matches the semantic keyword is determined.

In an optional embodiment of the present disclosure, determining the display information that matches the semantic keyword includes: matching locally stored display information with the semantic keyword, and determining the display information that matches the semantic keyword; and/or, uploading the semantic keyword, and receiving the display information fed back by a server and determined via matching that matches the semantic keyword.

In one embodiment, because a plurality of display information b n the same type may exist, for example, the display information corresponding to "高兴 (happy)" may be a smiling face, or may be an image showing jumping of a cartoon character, etc, a display information set may be used to store the plurality of display information. Further, the semantic keywords and the display information may not be associated in a one-to-one correspondence. Different semantic keywords may correspond to the same display information set, and a plurality of display information may exist in one display information set. For example, "不高兴 (not happy)" and "不开心 (no joyful)" may correspond to the same display information set.

Further, the display information includes but is not limited to expression images, multimedia information and webpage link information. The multimedia information includes information such as audio, video, and flash animation, etc. The webpage link information may include various types of information such as news, encyclopedia, and translation, etc.

When applying the semantic keyword to match the display information, the semantic keyword may be matched with the locally stored display information. Or, the semantic keyword may be uploaded, and the display information stored on the server side is applied to match the semantic keyword. Optionally, both two types of matching are conducted, thereby obtaining the display information that matches the semantic keyword, where the display information may be entire display information included in one or a plurality of sets.

For example, the expression image may be matched with the locally stored display information. Display information that matches the webpage link information may be acquired on the server side. The multimedia information may be matched both locally and on the server side, etc.

For example, in the aforementioned example, the semantic keyword "不开心 (not happy)" may match five expression images, and the expression images may correspond to serial numbers A1 to A5, respectively.

In Step 214, current environment information is recognized, and the display information that matches the semantic keyword according to the recognized environment information is screened.

Because different environment information has different requirements on the display information, the current environment information needs to be recognized, and then the display information that matches the semantic keyword is screened according to the environment information. In particular, the environment information may also be configured to perform screening on the specific display information, or perform screening on the types of the display information. The display information that satisfies the current input environment may be screened out via the environment information, such that the occurrence of issues such as the display information cannot be displayed, etc. may be avoided For example, for the expression image, if the current environment information is an online interaction environment such as a client terminal of instant messaging, the expression image may be a static expression image (.jpg), or a dynamic expression image (.GIF). If the current environment information is a message editing environment, the expression image may be an emoji expression or an emoticon expression, etc. Further, the multimedia information may not be displayed in the message editing environment.

In Step 216, the display information is sorted according to a pre-configured rule, and the sort order of the display information is determined.

The sorting rule of the display information is pre-configured in embodiments of the present disclosure, and the display information screened out based on the environment information according to the pre-configured rule may be sorted to determine the sort order of each display information. In particular, a plurality of sorting factors may be configured in the pre-configured rule, and the sorting factors include but are not limited to: a usage count of the display information, time when the display information is lastly used, a recommendation index of the display information, and a user's interest degree, etc. Sorting may be performed based on one or a plurality of sorting factors. For example, when sorting is performed based on a plurality of sorting factors, different weight information may be configured for each sorting factor, thereby performing weighted summation based on each weight information. Later, sorting is performed according to the computational results to determine the sort order of the display information.

In particular, the usage count of the display information refers to the usage count of the display information by a current user.

Time when the display information is lastly used refers to a duration between the time the display information is lastly used by the user and the current time, and the duration may be determined using day or minute as a unit.

The recommendation index of the display information refers to the recommendation degree of the display information recommended to the user for use by the server. The server may determine the recommendation index comprehensively according to the generation time of the display information, the number of user download times, and the actual content of the display information, etc. For example, when the expression image is used as the display information, during a holiday, the recommendation index of an expression image related to the holiday is relatively high. Or, for example, when the webpage news is used as the display information, the news occurred relatively recently or reports a vital event has a relatively high recommendation index.

The user's interest degree refers to the preference degree of the user towards the display information. The user's interest may be, for example, determined by statistically counting the amount of users that use, check, and evaluate the display information.

For example, when sorting the display information according to the sorting factors in the pre-configured rule, the user usage habits and the recommendation index, etc. may be calculated synthetically, and the computational principles are basically as follows: the coefficient 1 (e.g., 0.6) *the usage frequency by the current user+the coefficient 2 (e.g., 0.2)*(the frequency of the mostly used expression*a probability function of the duration between the time that the current expression is used lastly and the current time—the user usage frequency of the current expression)+coefficient 3 (e.g., 0.2)*the recommendation index. Accordingly, the display information may be sorted according to the computational result.

In particular, the probability function of the time duration is a probability function obtained by analyzing the data regarding the relationship between the overall enter-on-screen condition of the user expression and the time.

For example, the semantic keyword "不开心 (not happy)" in the aforementioned embodiments may match S expression images, and the expression images may correspond to serial numbers from A1 to A5, respectively, where A5 is the recommended expression. The sorting values corresponding to A1-A5 may be determined by calculation according to the user usage habit and the recommendation index, such that A-A5 is sorted, and the sort order is (A2, A3, A5, A4, A1).

In Step 218, the display information is displayed in the form of a pop-up bubble.

In an optional embodiment of the present disclosure, displaying the display information in the form of a pop-up bubble includes: acquiring first N display information according to the sort order, and displaying the first N display information in the form of a pop-up bubble at a cloud recommendation position of the current input method.

After sorting the display information, the first N display information may be determined according to the sort order, where N is a positive integer. For example, if N=2, the first two display information is acquired. Then, the first N display information is displayed. For example, the first N display information is displayed in the form of a pop-up bubble at a cloud recommendation position of the input method keyboard. That is, a display box of the pop-up bubble is displayed at the cloud recommendation position of the input method keyboard, and the first N display information is displayed in the display box.

For example, the sort order in the aforementioned example is (A2, A3, A5, A4, A1), and the first two expression images selected from (A2, A3, A5, A4, A1) is A2 and A3.

In Step 220, display processing is performed on the display information according to the user instruction.

After the display information is displayed in the form of a pop-up bubble, the user may choose to display content such as a candidate item, display information, etc. Accordingly, the user instruction may be received, and display processing may be performed on the display information according to the user instruction. In particular, the display information includes various different kinds of information, and the display methods of different information may vary from each other to some extent, which is described in detail hereinafter.

When the display information is expression images, selection of the expression images is performed according to the user instruction, and a selected expression image is entered on screen. That is, expression images displayed in the form of a pop-up bubble may be selected according to the user instruction, and the selected expression image may be entered on screen, in other words, the expression image is displayed in the information input region of the current input environment. In particular, the expression image and a corresponding candidate item may be entered on screen simultaneously, and displayed in the same information box or different information boxes when entered on screen. Or, only the expression image is entered on screen, and the candidate item may be processed according to subsequent instructions.

When the display information is multimedia information, selection of the multimedia information is performed according to the user instruction, and the selected multimedia information is broadcasted. A corresponding media player may be launched to broadcast the multimedia information. Or, the manner of displaying the multimedia information may be determined according to the environment information of the current application program. For example, the multimedia information may be directly broadcasted in the application program, or in an instant messaging application, the multimedia information may be sent to a friend (an information receiver) or recommended to a friend for watch.

When the display information is the webpage link information, selection of the webpage link information is performed according to the user instruction, and the webpage corresponding to the selected webpage link information is launched. An application program such as a browser may be invoked to launch the webpage corresponding to the webpage link information. Or, the manner of displaying the webpage link information may be determined according to the environment information of the current application program. For example, in the instant messaging application, the webpage link information may be sent to a friend, or recommended to a friend for watch.

As such, the candidate item corresponding to the input string may be recognized with reference to the context information, thereby recognizing the display information that satisfies the user input intention. Further, sorting may be performed on the display information based on a plurality of sorting factors in the pre-configured rule to acquire the display information most likely selected by the user.

Different from displaying the expression image in the first-screen candidate item, embodiments of the present disclosure may display the display information at a cloud recommendation position. Accordingly, occupation of the position of the first-screen candidate item may be avoided, and the number of operational steps in searching for recommendation information and a candidate item by the user may be reduced, thereby improving the input efficiency.

It should be noted that, for the method embodiments, for ease of simple description, the method embodiments are expressed in combinations of a series of actions. However, those skilled in the art should understand that embodiments of the present disclosure are not limited to the described order of actions, because according to the embodiments of the present disclosure, certain steps may be applied in other orders, or may be carried out simultaneously. Then, those skilled in the art should also understand that the embodiments described in the specification all belong to preferred embodiments, and the evolved actions may not be necessarily required by embodiments of the present disclosure.

Embodiment 3

Based on the aforementioned embodiments, the present disclosure also provides an input system.

Figure 3:
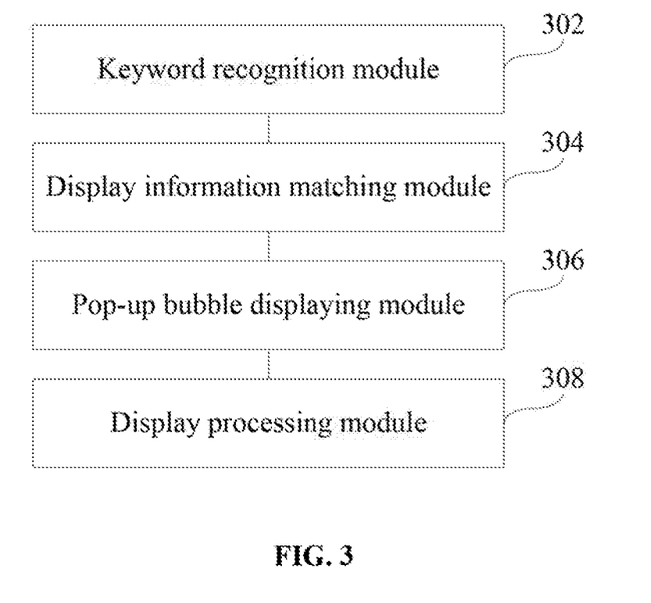
FIG. 3 illustrates a structural block diagram of an input system consistent with embodiments of the present disclosure.

Referring to FIG. 3, a structural block diagram of an input system consistent with embodiments of the present disclosure is illustrated, which specifically includes the following modules:

A keyword recognition module 302, configured to perform recognition processing on a received input string by using context information, and recognize a current semantic keyword;

A display information matching module 304, configured to determine display information that matches the semantic keyword, where the display information includes but is not limited to an expression image;

A pop-up bubble displaying module 306, configured to display the display information in a form of a pop-up bubble; and A display processing module 308, configured to perform display processing on the display information according to the user instruction, where the display processing includes but is not limited to entering the expression image on screen.

As such, because the context information is used to perform recognition processing on the received input string, the recognized current semantic keyword is not limited to the candidate item corresponding to the input string, and the semantic recognition based on the context information may better reflect the user input intention. Then, the display information that matches the semantic keyword is determined and, thus, the display information may better reflect the user input intention. The display information is displayed in the form of a pop-up bubble, and then display processing of the display information is performed according to the user instruction. For example, if the display information includes an expression image, the expression image may be entered on screen according to the instruction information. Thus, the display information may be acquired and displayed before a word is entered on screen, thereby improving the input efficiency of the display information such as words and expressions, etc.

Figure 4:
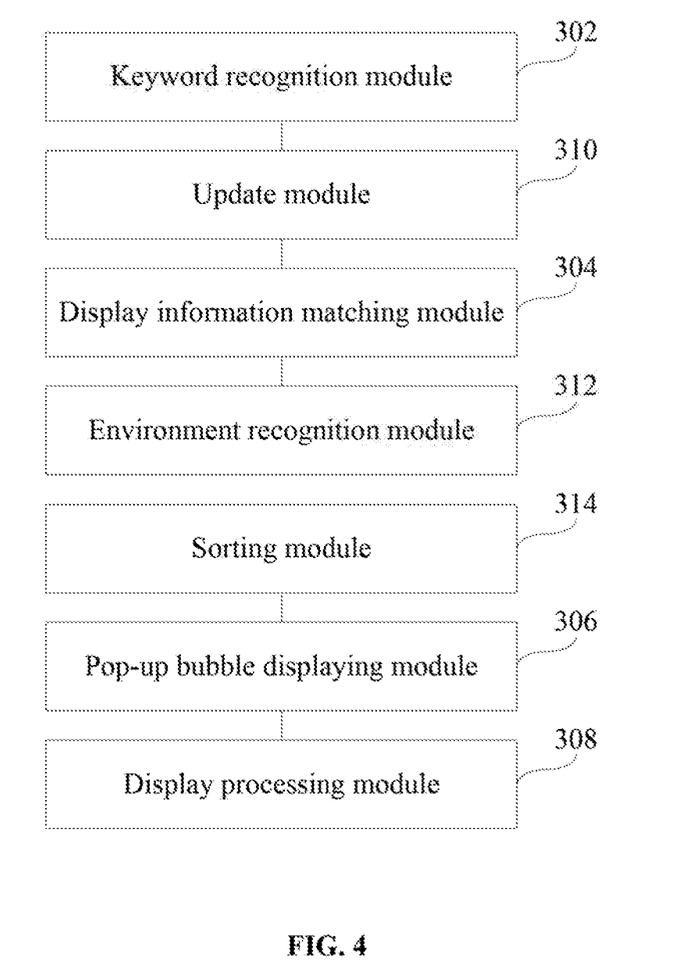
FIG. 4 illustrates a structural block diagram of an input system consistent with optional embodiments of the present disclosure.

Referring to FIG. 4, a structural block diagram of an input system consistent with optional embodiments of the present disclosure is illustrated, which may specifically include the following modules:

The keyword recognition module 302, configured to convert the input string, and recognize each candidate item corresponding to the input string; combine the context information and each candidate item into a candidate sentence, respectively; and perform semantic analysis of each candidate sentence, respectively, to recognize a current semantic keyword;

The display information matching module 304, configured to match locally stored display information and the semantic keyword, and determine the display information that matches the semantic keyword; and/or, upload the semantic keyword, and receive the display information fed back by a server and determined via matching that matches the semantic keyword.

The input system further includes:

An update module 310, configured to detect whether an update packet of the display information exists on the server side; and when the update packet of the display information exists, download and store the update packet locally;

An environment recognition module 312, configured to recognize current environment information, and screen the display information that matches the semantic keyword according to the recognized environment information;

A sorting module 314, configured to sort the display information according to pre-configured rule, and determine a sort order of the display information, where sorting factors in the pre-configured rule include but are not limited to: a usage count of the display information, time when the display information is lastly used, a recommendation index of the display information, and a user's interest degree, etc;

The pop-up bubble displaying module 306, configured to acquire first N display information according to the sort order; and display the first N display information in the form of a pop-up bubble at a cloud recommendation location of the current input method.

The display information further includes: multimedia information and webpage link information.

The display processing module 308 is configured to when the display information is expression images, perform selection of the expression images according to the user instruction, and enter a selected the expression image on screen; when the display information is multimedia information, perform selection of the multimedia information according to the user instruction, and broadcast the selected multimedia information; and when the display information is webpage link information, perform selection of the webpage link information according to the user instruction, and launch the webpage corresponding to the selected webpage link information.

As such, by recognizing the candidate item corresponding to the input string with reference to the context information, the display information that reflects the user input intention may be recognized. Further, the display information is sorted based on various sorting factors in the pre-configured rule to acquire the display information most likely selected by the user.

Different from displaying the expression image in the first-screen candidate item, embodiments of the present disclosure may display the display information at a cloud recommendation position. Accordingly, occupation of the position of the first-screen candidate item may be avoided, and the number of operational steps in searching for recommendation information and an candidate item by the user may be reduced, thereby improving the input efficiency.

For apparatus embodiments, because they are similar to the method embodiments, the descriptions are relatively simple, and related portions may be referred to a part of illustrations in the method embodiments.

Various embodiments of the present specification are described in a progressive manner, each embodiment highlights its difference from other embodiments, and similar parts between each embodiment can be referred to each other.

Those skilled in the art should understand that the embodiments of the present disclosure may provide methods, devices, or computer program products. Accordingly, embodiments of the present disclosure may all be hardware embodiments, or software embodiments, or in a combination form of software embodiments and hardware embodiments. Further, embodiments of the present disclosure may adopt a form of computer program products implemented in one or more computer-readable storage media (including but not limited to magnetic disc storage, CD-ROM, optical storage, etc.) including computer-readable program codes.

Aspects of the present disclosure are described with reference to flowcharts and/or block diagrams of the methods, terminal units (systems) and computer program products according to embodiments of the present disclosure. It should be understood that computer program instructions may implement each process and/or block in the flowcharts and/or block diagrams, and combinations of process and/or block in the flowcharts and/or the block diagrams. These computer program instructions may be provided to a processor of a general purpose computer, special purpose computer, or other programmable data processing terminal device to produce a machine, such that the instructions, which are executed via the processor of the computer or other programmable data processing terminal unit, create means for implementing functions specified in one process or a plurality of processes in the flowcharts and/or one block or a plurality of blocks in the block diagrams.

These computer program instructions may also be stored in a computer-readable medium that can direct a computer or other programmable data processing terminal devices in a particular manner, such that the instructions stored in the computer-readable medium produce an article of manufacture including an instructional device. The instructional device implements functions specified in one process or a plurality of processes in the flowcharts and/or one block or a plurality of blocks in the block diagrams.

These computer program instructions may also be loaded onto a computer, or other programmable data processing terminal units, such that the computer or other programmable terminal units execute a series of operational steps to produce a computer implemented process, such that the instructions executed in the computer or other programmable terminal units provide steps for implementing the functions specified in one process or a plurality of processes in the flowcharts and/or one block or a plurality of blocks in the block diagrams.

Though the preferred embodiments of the present disclosure are described, those skilled in the art can make additional alterations and modifications to these embodiments in case of knowing the basic creative concepts. Therefore, the appended claims intend to be defined as including the preferred embodiments as well as all of the alterations and modifications falling into the scope of the present disclosure.

Figure 5:
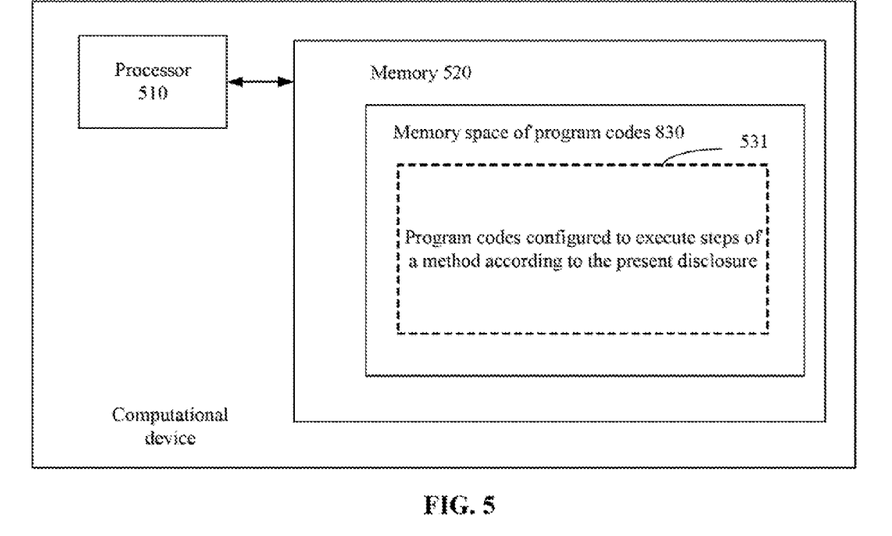
FIG. 5 illustrates a block diagram of a computing device for executing an input-based information display method according to the present disclosure.
Figure 6:
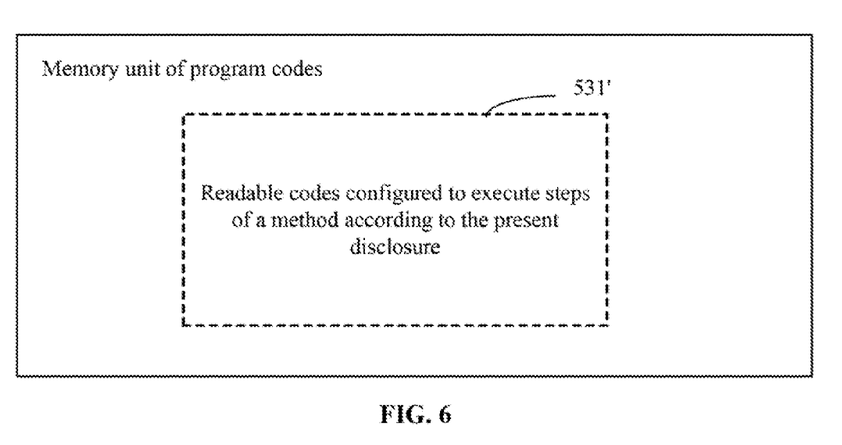
FIG. 6 illustrates a storage unit for storing or carrying program codes that implement an input-based information display method according to the present disclosure.

For example, FIG. 5 illustrates a computational device that may implement the adjustment of a virtual keyboard in an input method according to the present disclosure. The computational device traditionally includes a processor 510 and a program product or a readable medium in a form of a memory 520. The memory 520 may be an electronic memory such as a flash memory, an electrically erasable and programmable read only memory (EEPROM), an erasable programmable read-only memory (EPROM), or a read-only memory (ROM), etc. The memory 520 includes a memory space 530 of program codes 531 configured to execute any method step in the aforementioned method. For example, the memory space 530 of the program codes may include each program code 531 configured to implement each step in the aforementioned method, respectively. These program codes may be read out from one or a plurality of program products or written into one or a plurality of program products. These program products include program code carriers such as a memory card, etc. These program products are often portable or fixed memory units described in FIG. 6. The memory unit may include a memory section, a memory space, etc. similarly configured in the memory 520 of the computational device in FIG. 5. The program codes may be compressed, for example, in an appropriate manner. Typically, the memory unit includes readable codes 531', namely, codes that may be read by a processor such as 510. When these codes are run by the computational device, the computational device may execute each step in the method described above.

Last, it should be noted that, in this document, relational terms such as first and second, and the like may be used solely to distinguish one entity or operation from another entity or operation without necessarily requiring or implying any actual such relationship or order between such entities or operations. Further, terms "including", "comprising", or any other variation thereof are intended to cover a non-exclusive inclusion, such that a process, method, article or terminal device that comprises a list of elements does not include only those elements but may include other elements not expressly listed or inherent to such process, method, article, or terminal device. An element proceeded by "comprises . . . a" does not, without more constraints, preclude the existence of additional identical elements in the process, method, article, or terminal device that comprises the element.

Foregoing is detailed description of an input method, device and electronic apparatus provided by the present disclosure. Specific embodiments are applied in the document to illustrate principles and implementation methods of the present disclosure. Illustrations of the aforementioned embodiments are only used to help understand the method and core idea of the present disclosure. Meanwhile, those ordinarily skilled in the art may, according to the spirit of the present disclosure, make changes to specific embodiments and application scope. As such, the content of the specification should not be understood to be limiting of the present disclosure.

What is claimed is:

1. An input-based information display method, comprising:

using, by an input method client, context information to perform recognition processing on a received input string, and recognizing a current semantic keyword;

determining display information that matches the semantic keyword, and automatically displaying the display information in a form of a pop-up bubble in a graphical input method user interface of the input method client as a candidate option for user selection, wherein the display information includes expression images; and performing display processing on the display information according to a user instruction, wherein the display processing includes performing an enter-on-screen operation of the expression images, wherein using the context information to perform recognition processing on the input string, and recognizing the current semantic keyword comprises:

recognizing and converting, by the input method client, the input string into a candidate item in a target language;

generating a candidate sentence by combining the context information and the candidate item corresponding to the input string, wherein the context information is a text most recently entered on screen and recorded by the input method client; and performing semantic analysis of the candidate sentence to obtain the current semantic keyword; and wherein determining display information that matches the semantic keyword comprises:

sorting the display information according to a pre-configured rule, and determining a sort order of the display information for presenting the display information in the graphical input method user interface, wherein sorting factors in the pre-configured rule include at least one of: a usage count of the display information, time when the display information is lastly used, a recommendation index of the display information, and a user's interest degree.

2. The method according to claim 1, wherein using the context information to perform recognition processing on the received input string, and recognizing the current semantic keyword comprises:

converting the input string, and recognizing multiple candidate items in the target language corresponding to the input string;

generating multiple candidate sentences by combining the context information in the target language and each of the multiple candidate items, respectively; and performing semantic analysis of each candidate sentence, respectively, and recognizing a current semantic keyword.

3. The method according to claim 1, wherein determining the display information that matches the semantic keyword comprises:

matching locally stored display information with the semantic keyword, and determining the display information that matches the semantic keyword; and/or uploading the semantic keyword, and receiving the display information fed back by a server and determined via matching that matches the semantic keyword.

4. The method according to claim 1, wherein before a step of determining the display information that matches the semantic keyword, the method further comprising:

detecting whether an update packet of the display information exists on a server side; and when the update packet of the display information exists, downloading and storing the update packet locally.

5. The method according to claim 4, wherein after a step of determining the display information that matches the semantic keyword, the method further comprising:

recognizing current environment information, and screening the display information that matches the semantic keyword according to recognized environment information.

6. The method according to claim 5, wherein a step of displaying the display information in the form of a pop-up bubble comprises:

acquiring first N display information according to the sort order; and displaying the first N display information in the form of a pop-up bubble at a cloud recommendation position on the graphical input method user interface of the input method client.

7. The method according to claim 1, wherein the display information further comprises:

multi-media information and webpage link information.

8. The method according to claim 1, wherein a step of performing display processing on the display information according to the user instruction comprises:

when the display information includes expression images, performing selection of the expression images according to the user instruction, and entering a selected expression image on a screen;

when the display information includes multimedia information, performing selection of the multimedia information according to the user instruction, and broadcasting selected multimedia information; and when the display information includes webpage link information, performing selection of the webpage link information according to the user instruction, and launching a webpage corresponding to the webpage link information.

9. The method according to claim 1, wherein the input string is not in the target language.

10. The method according to claim 9, wherein the context information is a text in the target language.

11. An input system, comprising at least one processor, the at least one processor being configured for:

performing, by an input method client, recognition processing on a received input string using context information, and recognizing a current semantic keyword;

determining display information that matches the semantic keyword, wherein the display information includes expression images;

automatically displaying the display information in a form of a pop-up bubble in a graphical input method user interface of the input method client as a candidate option for user selection; and performing display processing on the display information according to a user instruction, wherein the display processing includes performing an enter-on-screen operation of the expression images, wherein performing recognition processing on the input string using the context information, and recognizing the current semantic keyword comprises:

recognizing and converting, by the input method client, the input string into a candidate item in a target language;

generating a candidate sentence by combining the context information and the candidate item corresponding to the input string, wherein the context information is a text most recently entered on screen and recorded by the input method client; and performing semantic analysis of the candidate sentence to obtain the current semantic keyword; and wherein determining display information that matches the semantic keyword comprises:

sorting the display information according to a pre-configured rule, and determining a sort order of the display information for presenting the display information in the graphical input method user interface, wherein sorting factors in the pre-configured rule include at least one of: a usage count of the display information, time when the display information is lastly used, a recommendation index of the display information, and a user's interest degree.

12. The system according to claim 11, wherein the at least one processor is further configured for:
converting the input string, and recognizing multiple candidate items in the target language corresponding to the input string;
generating multiple candidate sentences by combining the context information in the target language and each of the multiple candidate items, respectively; and
performing semantic analysis of each candidate sentence, respectively, and recognizing a current semantic keyword.

13. The system according to claim 11, wherein the at least one processor is further configured for:
matching locally stored display information with the semantic keyword, and determining the display information that matches the semantic keyword; and/or, uploading the semantic keyword, and receiving the display information fed back by a server and determined via matching that matches the semantic keyword.

14. The system according to claim 11, wherein the at least one processor is further configured for:
detecting whether an update packet of the display information exists on a server side; and when the update packet of the display information exists, downloading and storing the update packet locally.

15. The system according to claim 14, wherein the at least one processor is further configured for:
recognizing current environment information, and screening the display information that matches the semantic keyword according to recognized environment information.

16. The system according to claim 11, wherein the at least one processor is further configured for:
acquiring first N display information according to the sort order, and displaying the first N display information in the form of a pop-up bubble at a cloud recommendation position of the current input method.

17. The system according to claim 11, wherein the display information further includes multi-media information and webpage link information.

18. The system according to claim 11, wherein the at least one processor is further configured for:
when the display information includes expression images, performing selection of the expression images according to the user instruction, and entering a selected expression image on a screen;
when the display information includes multimedia information, performing selection of the multimedia information according to the user instruction, and broadcasting selected multimedia information; and
when the display information includes webpage link information, performing selection of the webpage link information according to the user instruction, and launching a webpage corresponding to the webpage link information.

19. A non-transitory computer-readable medium having a computer program for, when being executed by at least one processor, performing an input-based information display method, the method comprising:
using, by an input method client, context information to perform recognition processing on a received input string, and recognizing a current semantic keyword;
determining display information that matches the semantic keyword, and automatically displaying the display information in a form of a pop-up bubble in a graphical input method user interface of the input method client as a candidate option for user selection, wherein the display information includes expression images; and
performing display processing on the display information according to a user instruction, wherein the display processing includes performing an enter-on-screen operation of the expression images,
wherein using the context information to perform recognition processing on the input string, and recognizing the current semantic keyword comprises:
recognizing and converting, by the input method client, the input string into a candidate item in a target language;
generating a candidate sentence by combining the context information and the candidate item corresponding to the input string, wherein the context information is a text most recently entered on screen and recorded by the input method client, and
performing semantic analysis of the candidate sentence to obtain the current semantic keyword; and
wherein determining display information that matches the semantic keyword comprises:
sorting the display information according to a pre-configured rule, and determining a sort order of the display information for presenting the display information in the graphical input method user interface, wherein sorting factors in the pre-configured rule include at least one of: a usage count of the display information, time when the display information is lastly used, a recommendation index of the display information, and a user's interest degree.

20. The computer-readable medium according to claim 19, wherein using the context information to perform recognition processing on the received input string, and recognizing the current semantic keyword further comprises:
converting the input string, and recognizing multiple candidate items in the target language corresponding to the input string;
generating multiple candidate sentences by combining the context information in the target language and each of the multiple candidate items, respectively; and
performing semantic analysis of each candidate sentence, respectively, and recognizing a current semantic keyword.

* * * * *